(12) United States Patent
Toyoda et al.

(10) Patent No.: US 9,785,579 B2
(45) Date of Patent: Oct. 10, 2017

(54) MEMORY CONTROLLER, INFORMATION PROCESSING APPARATUS, AND METHOD OF CONTROLLING MEMORY CONTROLLER

(71) Applicant: FUJITSU LIMITED, Kawasaki-shi, Kanagawa (JP)

(72) Inventors: Yuta Toyoda, Kawasaki (JP); Koji Hosoe, Yamato (JP); Akio Tokoyoda, Fuchu (JP); Masatoshi Aihara, Hiratsuka (JP); Makoto Suga, Edogawa (JP)

(73) Assignee: FUJITSU LIMITED, Kawasaki (JP)

( * ) Notice: Subject to any disclaimer, the term of this patent is extended or adjusted under 35 U.S.C. 154(b) by 305 days.

(21) Appl. No.: 14/542,730

(22) Filed: Nov. 17, 2014

(65) Prior Publication Data

US 2015/0149675 A1   May 28, 2015

(30) Foreign Application Priority Data

Nov. 25, 2013   (JP) ................................. 2013-242943

(51) Int. Cl.
*G06F 13/36* (2006.01)
*G06F 13/00* (2006.01)
*G06F 13/16* (2006.01)
*G06F 13/366* (2006.01)

(52) U.S. Cl.
CPC ........ *G06F 13/1605* (2013.01); *G06F 13/161* (2013.01); *G06F 13/366* (2013.01)

(58) Field of Classification Search
None
See application file for complete search history.

(56) References Cited

U.S. PATENT DOCUMENTS

| 6,209,067 | B1 * | 3/2001 | Collins | ............... | G06F 12/0831 |
| | | | | | 710/240 |
| 2004/0268056 | A1 * | 12/2004 | Landin | ................ | G06F 12/0813 |
| | | | | | 711/144 |
| 2004/0268059 | A1 * | 12/2004 | Landin | ................ | G06F 12/0828 |
| | | | | | 711/145 |
| 2005/0005082 | A1 * | 1/2005 | Au | ....................... | G06F 12/0893 |
| | | | | | 711/170 |

(Continued)

FOREIGN PATENT DOCUMENTS

JP   2011-180656   9/2011

*Primary Examiner* — Michael Sun
(74) *Attorney, Agent, or Firm* — Fujitsu Patent Center

(57) ABSTRACT

A memory controller has a request holding unit holding a write request and a read request; a transmission unit transmitting any one of the write request and the read request to a memory through a transmission bus; a reception unit receiving read data corresponding to the read request through a reception bus; and a request arbitration unit performing: a first processing of transmitting the write request before the read request, when a first reception time is not later than a second reception time, and a second processing of transmitting the read request before the write request, when the first reception time is later than the second reception time. The first reception time is when reception of the read data is started when the write request is transmitted first, and the second reception time is when the reception of the read data is started when the read request is transmitted first.

9 Claims, 11 Drawing Sheets

(56) References Cited

U.S. PATENT DOCUMENTS

| | | | |
|---|---|---|---|
| 2006/0047919 A1* | 3/2006 | Jenkins | G06F 13/1652 711/150 |
| 2006/0236012 A1* | 10/2006 | Hayashi | G06F 13/1605 710/241 |
| 2007/0204076 A1* | 8/2007 | Arulambalam | G06F 13/28 710/35 |
| 2011/0179200 A1* | 7/2011 | Sukonik | G06F 13/1642 710/53 |
| 2012/0066432 A1* | 3/2012 | Miura | G06F 13/161 711/102 |
| 2012/0102293 A1* | 4/2012 | Negishi | G06F 13/1626 711/200 |
| 2013/0185477 A1* | 7/2013 | Acuna | G06F 11/263 711/103 |

* cited by examiner

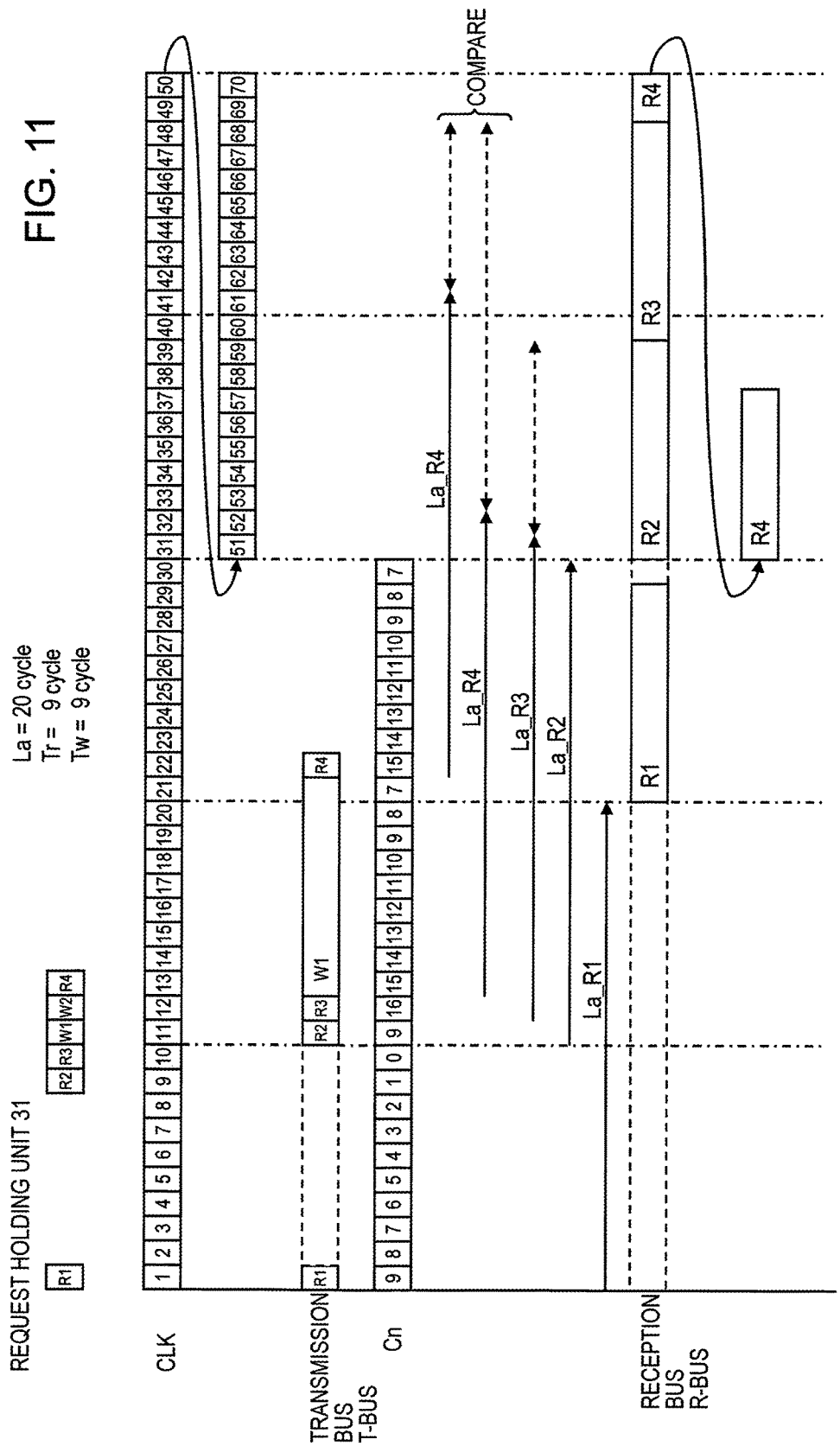

MEMORY CONTROLLER, INFORMATION PROCESSING APPARATUS, AND METHOD OF CONTROLLING MEMORY CONTROLLER

CROSS-REFERENCE TO RELATED APPLICATION

This application is based upon and claims the benefit of priority of the prior Japanese Patent Application No. 2013-242943, filed on Nov. 25, 2013, the entire contents of which are incorporated herein by reference.

FIELD

The present invention relates to a memory controller, an information processing apparatus, and a method of controlling a memory controller.

BACKGROUND

Memory controller is incorporated in or provided outside of an arithmetic processing apparatus such as a processor, and control access to a main memory such as a dynamic random access memory (DRAM).

Memory modules incorporating a DRAM controller chip, such as a hybrid memory cube (HMC), is under development to be the successor of conventional DRAM modules, used as a main memory of an information processing apparatus. The memory module is connected to a memory controller on a processor side through a high-speed serial bus. The high-speed serial bus includes a transmission serial bus and a reception serial bus. A request command requesting an access from the processor side is transmitted to the memory module through the transmission serial bus. When the request command is a write command, a write request command is transmitted through the transmission serial bus, together with write data. When the request command is a read command, a read request command is transmitted through the transmission serial bus. Then, read data is read out from the memory module, and after a latency time, the read data is returned to the processor side as a reply through the reception serial bus.

SUMMARY

In the high-speed serial bus, having the configuration described above, the memory controller on the processor side preferably issues a request command in such a manner that the controller monopolizes both the transmission and reception serial buses efficiently, to proximate memory access to theoretical maximum throughput.

However, the high-speed serial bus has the limitation that the read command and the write command with the write data are both transmitted through the transmission serial bus, whereas the read data is returned through the reception serial bus. Thus, when the write command is transmitted with a priority over the read command by the memory controller, the transmission of the read command is restricted, whereas, when the read command is transmitted with a priority over the write command by the memory controller, the transmission of the write command is restricted, making the control with theoretical maximum throughput difficult to achieve.

A memory controller comprising:
a request holding unit configured to hold a write request and a read request that are received;
a transmission unit configured to transmit any one of the write request with write data and the read request to a memory through a transmission bus;
a reception unit configured to receive read data corresponding to the read request from the memory through a reception bus; and
a request arbitration unit configured to perform: for the write request or the read request in transmission standby held by the request holding unit,
a first processing of transmitting the write request with the write data to the transmission bus through the transmission unit before transmitting the read request, when a first reception time is not later than a second reception time, the first reception time being a time when reception, through the reception bus from the memory, of the read data corresponding to the read request is started in a case where the write request with the write data is transmitted to the transmission bus before the read request is transmitted, and the second reception time being a time when the reception of the read data is started in a case where the read request is transmitted to the transmission bus before the write request and the write data are transmitted; and
a second processing of transmitting the read request to the transmission bus through the transmission unit before transmitting the write request with the write data, when the first reception time is later than the second reception time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram exemplary illustrating how the count value Cn of the counter 35 is reset.

DESCRIPTION OF EMBODIMENTS

Figure 1:
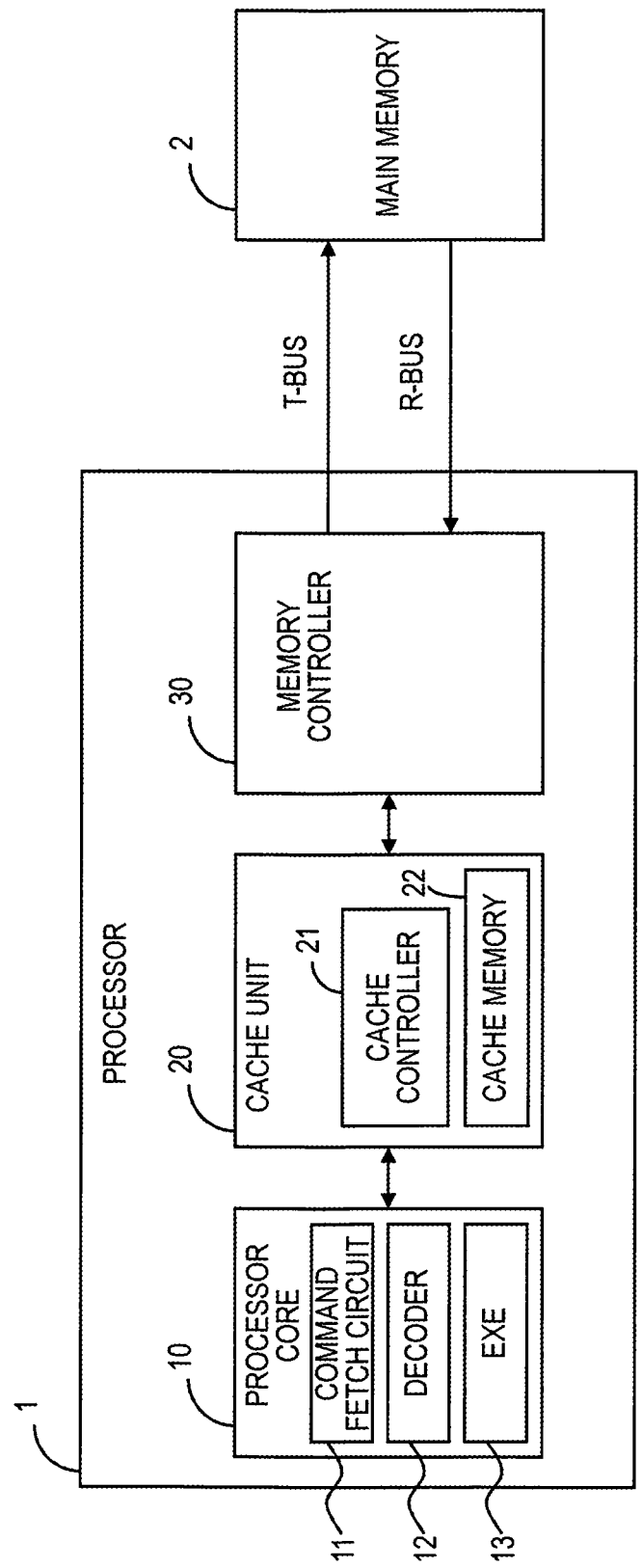
FIG. 1 is a diagram illustrating configurations of a memory controller, a processor, and a main memory in this embodiment.

FIG. 1 is a diagram illustrating configurations of a memory controller, a processor, and a main memory in this embodiment. In an example in FIG. 1, a processor 1 includes a processor core 10, a cache unit 20, and a memory controller 30.

For example, the processor core 10 includes a command fetch circuit 11, a decoder 12 that decodes a fetched command, and an execution unit 13 that executes the decoded command. Generally, a command is executed in the following manner. Specifically, the processor core 10 fetches data from a main memory 2, stores the same in a register, executes processing corresponding to the command, and writes the processing result in the main memory 2.

The cache unit 20 includes a cache controller 21 and a cache memory 22. The cache controller 21 determines whether a cache hit is successful in response to an access request (a write or read request) from the processor core 10 to the main memory 2. The cache controller 21 issues the write or read request to the memory controller 30 when a cache miss occurs.

The memory controller 30 receives the write or read request thus issued, holds the received request in an unillustrated request holding unit, and transmits the write or read request to the main memory 2 through a transmission serial bus (transmission bus) T-BUS. Then, the memory controller 30 receives read data corresponding to the read request through a reception serial bus (reception bus) R-BUS from the main memory 2. As described later, write data is transmitted together with the write request by the memory controller 30.

Figure 2:
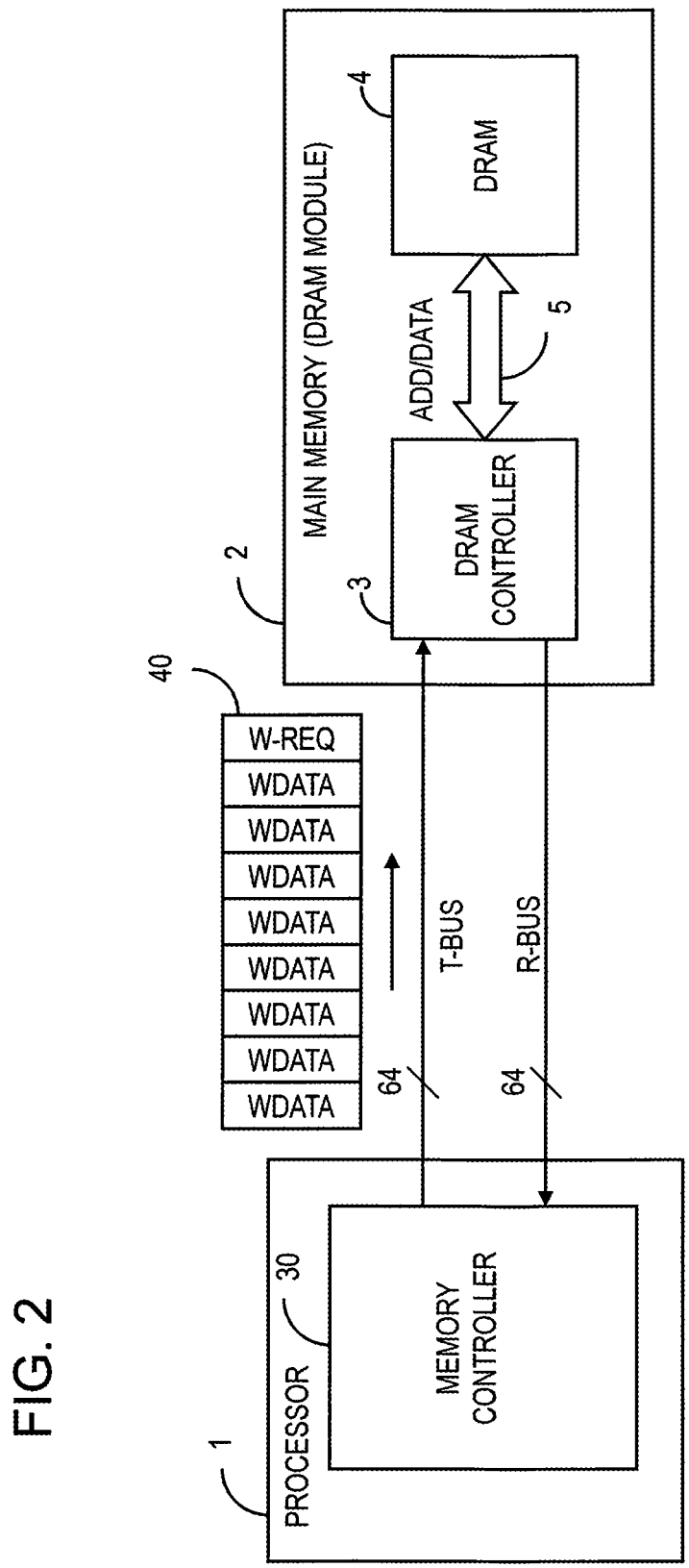
FIG. 2 is a diagram illustrating an operation performed by the memory controller 30 when the write request is issued in this embodiment.

FIG. 2 is a diagram illustrating an operation performed by the memory controller 30 when the write request is issued in this embodiment. The main memory 2 is a DRAM module for example, and includes a DRAM controller 3, a DRAM 4, and an address/data wiring 5 connecting between the DRAM controller 3 and the DRAM 4.

The memory controller 30 transmits the write request to the main memory 2 in the following manner. Specifically, the memory controller 30 transmits a write packet group 40 of nine packets including a header W-REQ of the write request and data group WDATA to be written with the write request, to the transmission serial bus (transmission bus) T-BUS.

The header W-REQ of the write request is a packet including, for example, a memory address, a burst length, and the write request. The header W-REQ of the write request and the packets of the write data group WDATA are respectively 64 bit in length for example. In the example of FIG. 2, the burst length is eight, and thus eight data pieces of the packet WDATA are serially transmitted after the header W-REQ.

The transmission serial bus (transmission bus) T-BUS has a 64 bit width, and thus a 64-bit packet is transmitted in synchronization with a clock. Thus, the write packet group 40, including the nine packets in FIG. 2, monopolizes the transmission serial bus T-BUS for nine clock cycles. When the write request is issued, the reception serial bus (reception bus) R-BUS is not monopolized.

The DRAM controller 3 in the main memory 2 supplies an active command and a row address for example to the DRAM 4 in response to the header W-REQ of the write request. Then, the DRAM controller 3 supplies the write command, a column address, and the write data.

Figure 3:
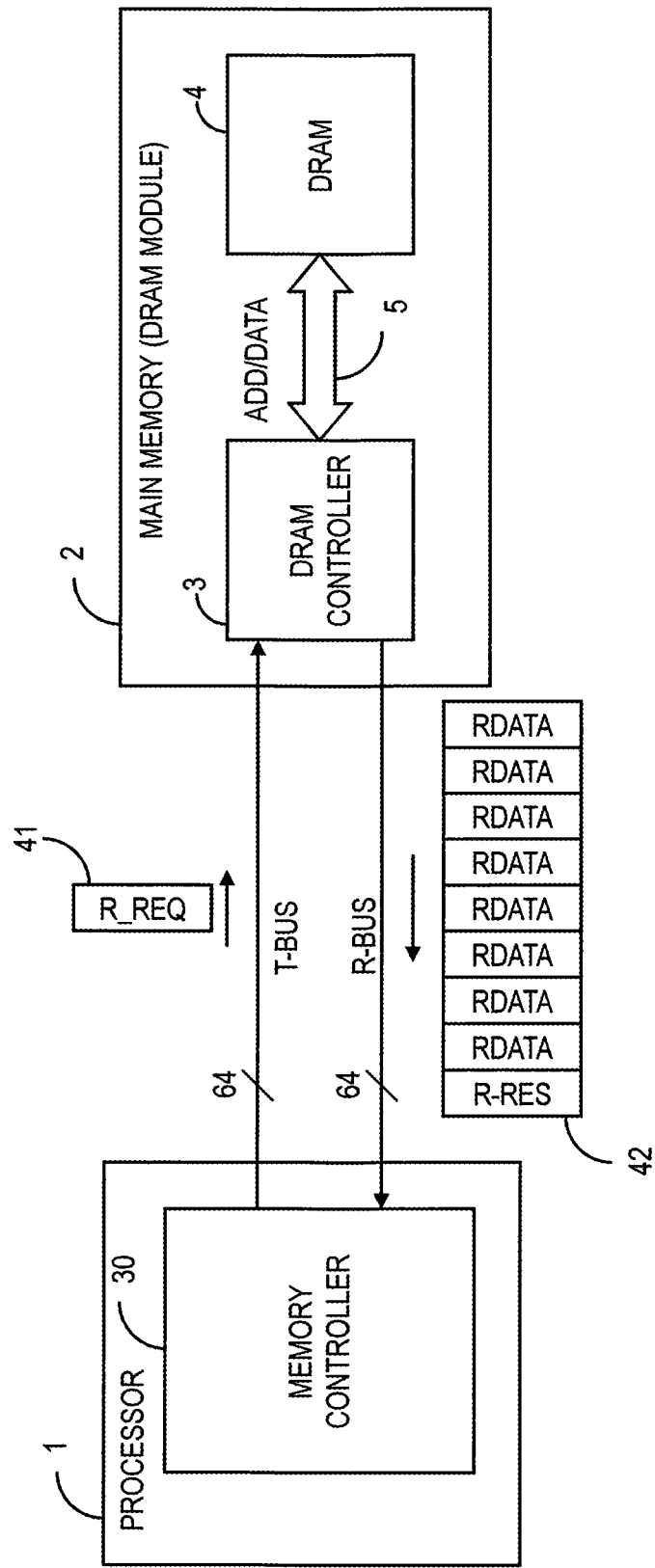
FIG. 3 is a diagram illustrating an operation performed by the memory controller 30 when the read request is issued in this embodiment.

FIG. 3 is a diagram illustrating an operation performed by the memory controller 30 when the read request is issued in this embodiment. The memory controller 30 transmits the read request to the main memory 2 in the following manner. Specifically, the memory controller 30 transmits a header R-REQ of the read request to the transmission serial bus (transmission bus) T-BUS. The header R-REQ of the read request is similar to the header of the write request, and is a 64 bit packet including the memory address, the burst length, and the read request. Thus, the packet R-REQ as the header of the read request monopolizes the transmission serial bus T-BUS for a single clock cycle.

The memory controller 30 starts to receive a read response packet group 42 of nine packets having a read response header R-RES and subsequent read data group RDATA of eight burst length, read out from the main memory 2, through the reception serial bus (reception bus) R-BUS, when a latency time La elapses after transmitting the header R-REQ of the read request. The nine packets include a read response header R-RES and subsequent read data group RDATA of eight burst length, read out from the main memory 2. The read data group RDATA is also a 64 bit packet. The DRAM controller 3 in the main memory 2 transmits the read response packet group 42 in synchronization with the clock, and thus the read response packet group 42 including nine packets monopolizes the reception serial bus R-BUS for nine clock cycles.

As described above, when the write request is issued, the header W-REQ of the write request and the packet group 40 of eight pieces of the write data WDATA monopolizes the transmission serial bus (transmission bus) T-BUS. When the read request is issued, the packet 41 of the header R-REQ of the read request monopolizes the transmission serial bus T-BUS for a single clock cycle, and after the latency time elapses, the packet group 42 including the header of read request R-REQ and the eight pieces of read data RDATA monopolizes the reception serial bus R-BUS for nine clock cycles. The eight burst length described above is merely an example, and the burst length may be fixed or may change.

The number of clock cycles during which the transmission bus T-BUS is monopolized when the write request is issued is defined as Tw. The number of clock cycles during which the reception bus R-BUS is monopolized when the read data is received after the issuance of read request is defined as Tr. An average latency time between the transmission of the read request and the read data reception start, when the read request is issued, is defined as La. In the above described example, the burst length is eight, and thus Tw and Tr are both nine, and the number of clock cycles during which the header R-REQ of the read request monopolizes the transmission bus T-BUS is one. The average latency time La is 20 for example.

As described above by referring to FIGS. 2 and 3, in the main memory 2, the DRAM controller 3 outputs an active command and a read command corresponding to the read request to an unillustrated plurality of memory blocks in the DRAM 4. Thus, the latency time is likely to be long when the addresses of the plurality of serial read requests are concentrated on the memory blocks, and likely to be short when the addresses are no concentrated thereon. Thus, in this embodiment, request arbitration is performed by using the average latency time La. Alternatively, when the latency time for the read request can be accurately determined, the request arbitration can be performed by using the determined latency time.

Figure 4:
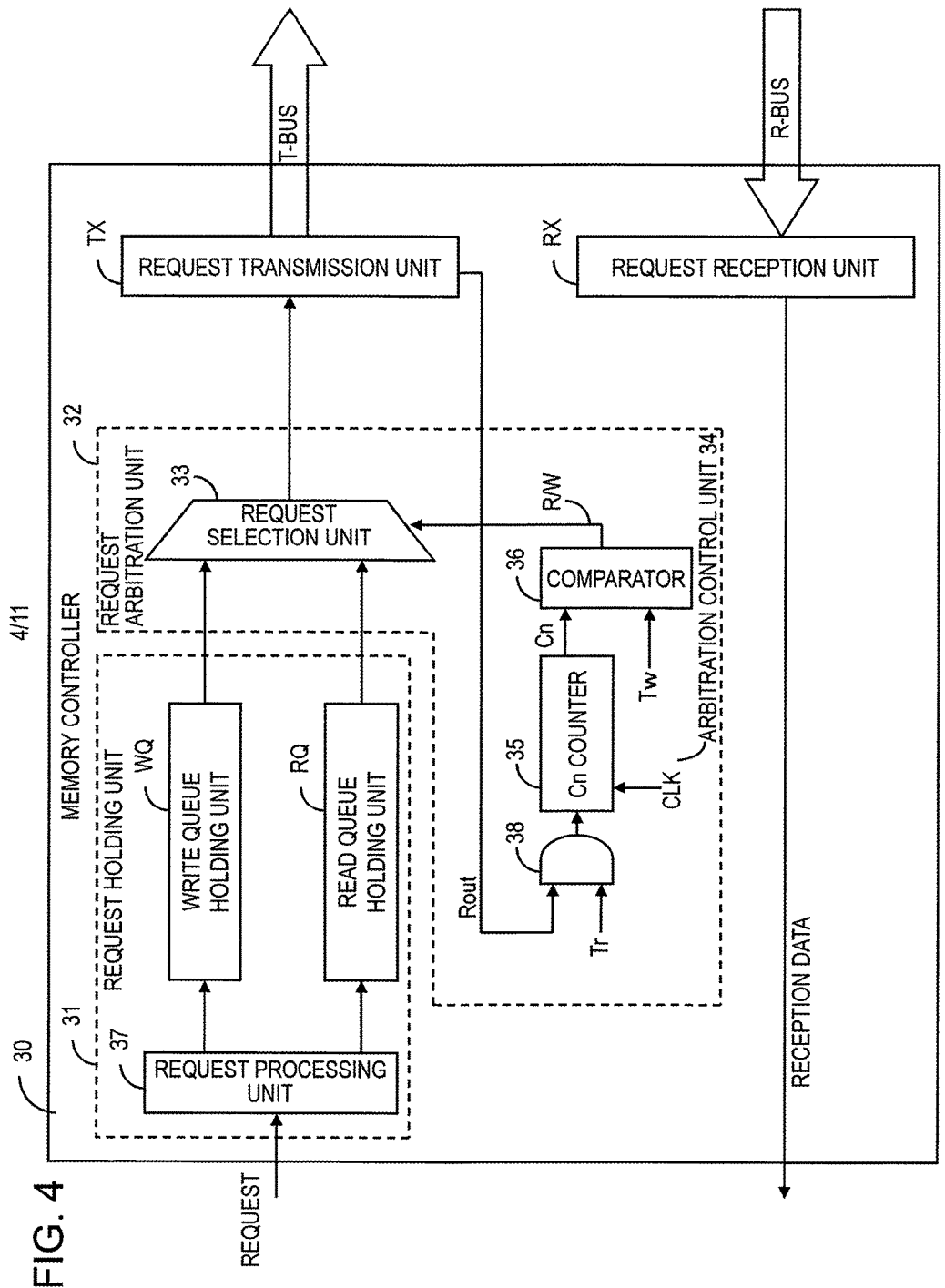
FIG. 4 is a configuration diagram of the memory controller 30 in this embodiment.

FIG. 4 is a configuration diagram of the memory controller 30 in this embodiment. The memory controller 30 includes a request holding unit 31, a transmission unit (request transmission unit) TX, a reception unit (request reception unit) RX, and a request arbitration unit 32. The request holding unit 31 holds the received write and read requests. The transmission unit TX transmits the read request or the write request with the write data to the memory 2 through the transmission bus (transmission serial bus) T-BUS. The reception unit RX receives the read data corresponding to the read request from the memory 2 through the reception bus (reception serial bus) R-BUS. The request arbitration unit 32 determines the one of the write and read requests to be transmitted first.

For example, the request arbitration unit 32 transmits the write request prior to the read request, among the write request and the read request in transmission standby held by the request holding unit 31, in a case where even when the write request is transmitted prior to the read request, reception start time of the read data corresponding to the read request transmitted subsequent to the write request is the same as reception start time in a case where the read request is transmitted first. Meanwhile, the request arbitration unit 32 transmits the read request prior to the write request, in case where when transmitting the write request first and then transmitting the read request, the reception start time of the read data corresponding to the read request therefor is later than the reception time in case where the read request is transmitted first.

In other words, the request arbitration unit 32 performs arbitration in such a manner that the read request in transmission standby is, as a general rule, transmitted with a priority over the write request. But the write request is transmitted with a higher priority in a case where transmission of a plurality of read requests leads to a long monopoly period of the reception bus R-BUS by the read data packet groups 42 corresponding to the read requests and also where even if the transmission of the write request is prioritized over the transmission of next read request, no delay is caused in the reception start time of the next read request due to the prioritization of the write request. With the arbitration, the read request is, as a general rule, transmitted with a higher priority over the write request, and thus the optimum monopolized state of the reception bus R-BUS can be achieved. Furthermore, when the reception start time of the read data is same or unaffected even if write request transmission is prioritized, the delay in the write request transmission can be prevented by transmitting the write request first.

Figure 5:
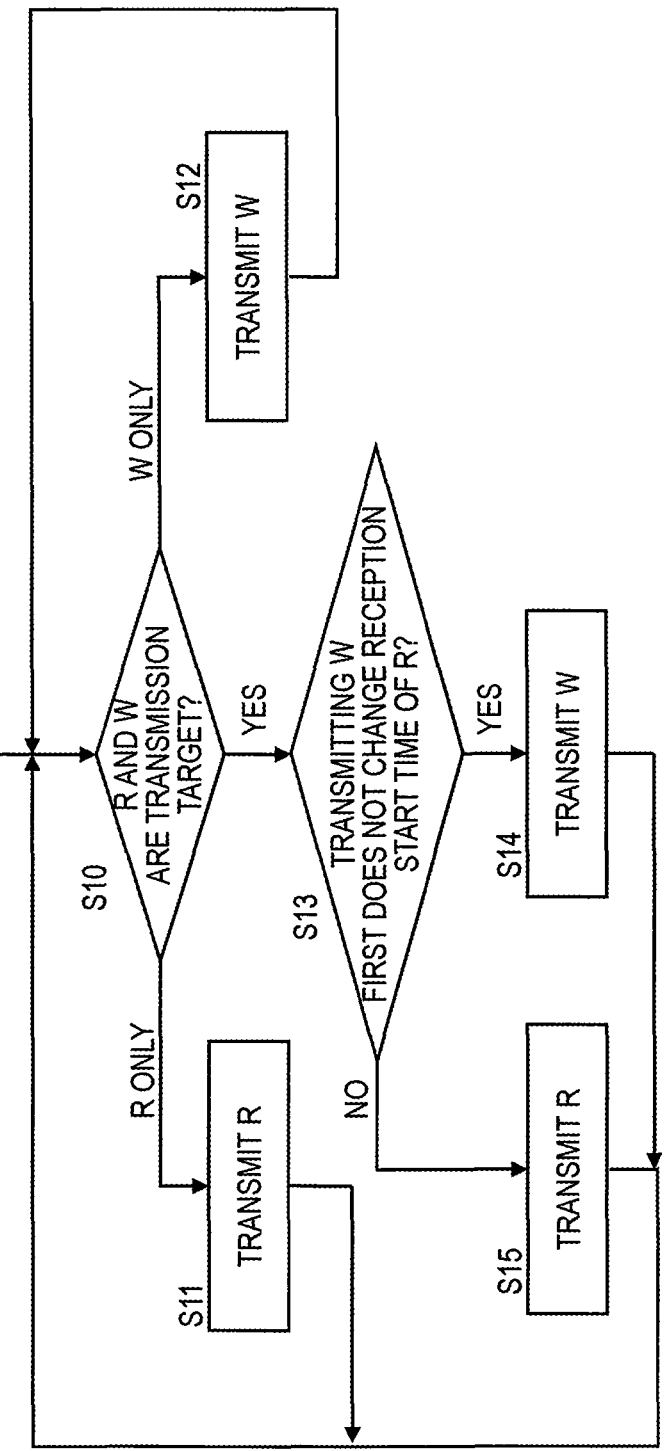
FIG. 5 is a flowchart of an arbitration control performed by the request arbitration unit 32 in this embodiment.

FIG. 5 is a flowchart of an arbitration control performed by the request arbitration unit 32 in this embodiment. The request arbitration unit 32 determines whether the request holding unit 31 holds both the write and the read requests so that both requests are transmission targets (S10). When only the read request is the transmission target, (R only in S10), the request arbitration unit 32 selects the read request so that the read request is transmitted by the request transmission unit TX (S11). When only the write request is the transmission target (W only in S10), the request arbitration unit 32 selects the write request to be transmitted by the request transmission unit TX (S12).

When both the write and the read requests serving as the transmission targets are saved in the request holding unit 31 (YES in S10), the request arbitration unit 32 determines whether the reception start time of the read data corresponding to the read request in the case where the write request is transmitted first is the same as that in the case where the read request is transmitted first, that is, whether the reception start time of the read data corresponding to the read request does not delay even when the write request is transmitted first (S13).

When the reception start time of the read data corresponding to the read request is the same as that in the case where the read request is transmitted first, even when the write request is transmitted first (YES in S13), the request arbitration unit 32 selects the write request to be output first to the request transmission unit TX with a priority over the read request. Thus, the request transmission unit TX transmits the write request to the transmission bus T-BUS (S14). When the reception start times are not the same (NO in S13), and thus the reception start time of the read data delays, the request arbitration unit 32 selects the read request to be output first to the request transmission unit TX with a priority over the write request. Thus, the request transmission unit TX transmits the read request to transmission bus T-BUS (S15).

As described above, the request arbitration unit 32 performs the following arbitration control. Specifically, the transmission is performed with a first-in-first-out-system applied for the read requests, and for the write requests respectively. When there is a conflict between the read and the write requests to be selected, the read request is usually transmitted with a higher priority. The write request is transmitted first, that is, with a higher priority, when the transmission of the write request does not cause the delay in reception start time of the read data.

The request arbitration control is described in detail as follows.

Specifically, the request arbitration unit 32 performs first processing and second processing for the write and the read requests in transmission standby held by the request holding unit 31. In the first processing, the write request and the write data are transmitted to the transmission bus T-BUS through the request transmission unit TX before the read request is transmitted. The first processing is performed when a first reception time is not later than a second reception time. The first reception time is a time when the read data, i.e. read response, corresponding to the read request is received from the memory 2 through the reception bus R-BUS, in a case where the write request and the write data are transmitted to the transmission bus T-BUS before the read request. The second reception time is a time when the read data, i.e. read response, is received in a case where the read request is transmitted to the transmission bus T-BUS before the write request and the write data. In the second processing the read request is transmitted to the transmission bus T-BUS through the request transmission unit TX before the write request and the write data are transmitted. The second processing is performed when the first reception time is later than the second reception time.

The memory controller 30 illustrated in FIG. 4 has the following specific configuration.

The request holding unit 31 in the memory controller 30 includes a request processing unit 37. The request processing unit 37 receives the write request or the read request from the processor core side, determines whether the received request is the write request or the read request, and makes a write queue holding unit WQ hold the write request or makes a read queue holding unit RQ hold the read request.

The request holding unit 31 includes the write queue holding unit WQ and the read queue holding unit RQ, which are buffers storing requests under a first-in-first-out (FIFO) system. Thus, the write requests are serially transmitted to the main memory 2 from the one received first from the processor core side. Similarly, the read requests are serially transmitted to the main memory 2 from the one received first from the processor core side.

The request arbitration unit 32 performs the arbitration to select the one of the first write request and the first read request, respectively in the write queue holding unit WQ and the read queue holding unit RQ, to be transmitted first through the transmission bus T-BUS. The request selected by the request arbitration unit 32 is transmitted from the request transmission unit TX to the transmission serial bus T-BUS, as the packet group 40 of the write request or as the packet 41 of the header R-REQ of the read request.

The request arbitration unit 32 includes an arbitration controller 34 and a request selector 33. The arbitration controller 34 determines one of the first write request and the first read request, respectively in the write queue holding unit WQ and the read queue holding unit RQ, to be transmitted first. The request selector 33 selectively outputs to the request transmission unit TX, the one of the write request and the read request determined to be transmitted first by the arbitration controller 34. In the figure, the reference sign R/W denotes a selection signal.

The arbitration controller 34 of the request arbitration unit 32 performs the arbitration to determine the one of the write and the read requests to be transmitted first through the method described above. The arbitration controller 34 has the specific configuration of including a Cn counter 35 and a comparator 36. The Cn counter 35 increments a count value Cn by the number of reception bus monopolized cycles Tr in response to a read request transmission signal Rout from the request transmission unit TX when the read request is transmitted. When the count value Cn is not 0, the Cn counter 35 decrements the count value Cn by one in every clock cycle, in synchronization with the clock CLK. The comparator 36 compares the count value Cn of the Cn counter 35 with the number of transmission bus monopolized cycles Tw.

When the count value Cn is equal to or larger than the number of transmission bus monopolized cycles Tw (Cn≥Tw), the comparator 36 selects the write request with a priority over the read request. When Cn≥Tw does not hold true, the comparator 36 selects the read request with a priority over the write request. When the comparator 36 selects the write request, the request selector 33 selects the write request in the write queue holding unit WQ, so that the request transmission unit TX transmits the packet group 40 of the write request to the transmission bus T-BUS. When the comparator 36 selects the read request, the request selector 33 selects the read request in the read queue holding unit RQ, so that the request transmission unit TX transmits the header packet 41 of the read request to the transmission bus T-BUS. The count value Cn of the Cn counter 35 is incremented by Tr through the AND gate 38, in response to the read request transmission signal Rout at a timing at which request transmission unit TX transmits the header packet 41 of the read request.

Next, the request arbitration performed by the memory controller 30 is described by referring to drawings. The mechanism of the request arbitration based on Cn≥Tw described above will be understood from this description.

Figure 6:
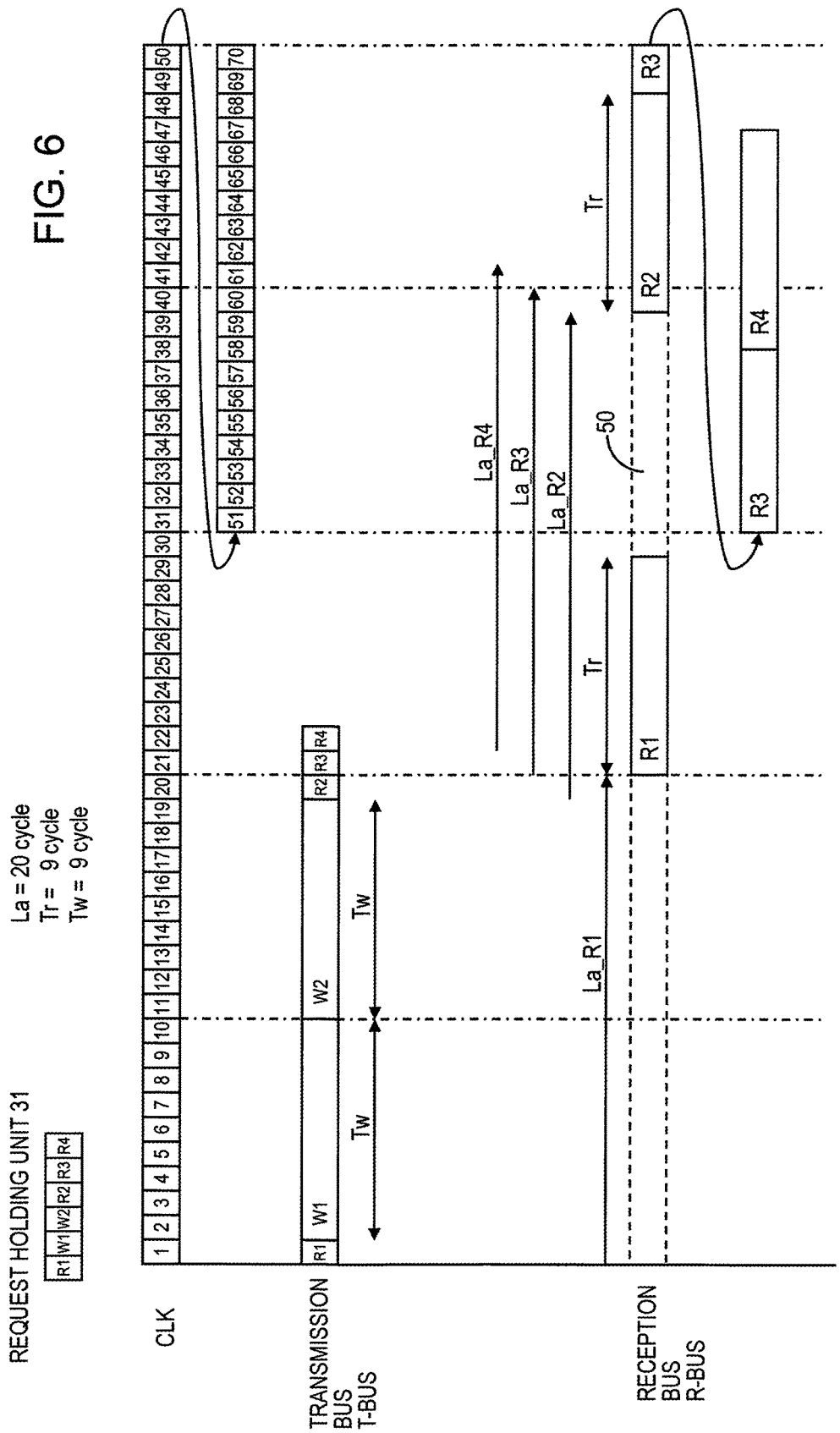
FIG. 6 is a diagram illustrating an operation performed by the memory controller 30 when the requests are transmitted in the order of reception.

FIG. 6 is a diagram illustrating an operation performed by the memory controller 30 when the requests are transmitted in the order of reception, under the conditions according to which the average latency time La is 20, Tw is 9, and Tr is 9. The latency time La is a period between the transmission of the read request and the reception start of the read data. Tw represents time during which the packet group of the write request monopolizes the transmission bus. Tr represents time during which the packet group of the read data corresponding to the read request monopolizes the reception bus. Thus, an example is described where the burst length is eight in both the write request and the read request. As a further condition, the request have been received and held in the request holding unit 31 in the order of R1, W1, W2, R2, R3, and R4, where R represents the reception request and W represents the write request.

In the example of FIG. 6, the request arbitration unit 32 of the memory controller 30 performs the arbitration so that the requests are transmitted to the transmission bus T-BUS in the order of reception through the following steps. (1) The header of the read request R1 is transmitted to the transmission bus T-BUS at the point where the clock CLK=1, and after the latency time La_R1=20, that is, from the point where the clock CLK=21, the read data monopolizes the reception bus for nine cycles (Tr=9). Then, (2) the write request W1 is transmitted to the transmission bus T-BUS at the point where the clock CLK=2, and the header of the write request and the packet group of the write data monopolize the transmission bus T-BUS for nine cycles (Tw=9) from the point where the clock CLK=2.

(3) The packet group of the next write request W2 monopolizes the transmission bus T-BUS for nine cycles from the point where the clock CLK=11. (4) The read requests R2, R3, and R4 are transmitted to the transmission bus T-BUS in this order from the point where the clock CLK=20. Thus, after the read latency time La=20, that is, from the point where the clock CLK=40, the read data of the read request R2 monopolizes the reception bus R-BUS for nine cycles. The read data corresponding to the read request R3 and the read data corresponding to the read request R4 each monopolize the reception bus R-BUS for nine cycles respectively from the points where the clock CLK=49 and where the clock CLK=58.

When the requests are transmitted in the order of reception as illustrated in FIG. 6, the read request is not transmitted during the period where clocks CLK=2 to 19, that is, 18 cycles during which the write requests W1 and W2 are transmitted. Thus, the transmission of the read requests R2, R3, and R4 is delayed to be at the points where CLK=20 to 22, and the read data of each of the read requests R2, R3, and R4 is only received after the corresponding one of latency times La_R2, La_R3, and La_R4.

The processor core generally fetches data from the main memory 2, processes the data, and writes back the resultant data to the main memory 2. Thus, preferably, the data reading (data fetching) is performed with a priority over the data writing so that the read data is acquired with the smallest possible delay. In this respect, the throughput is low in the example of FIG. 6 because the reception bus R-BUS is idle during a period 50 at the points where CLK=30 to 39.

Figure 7:
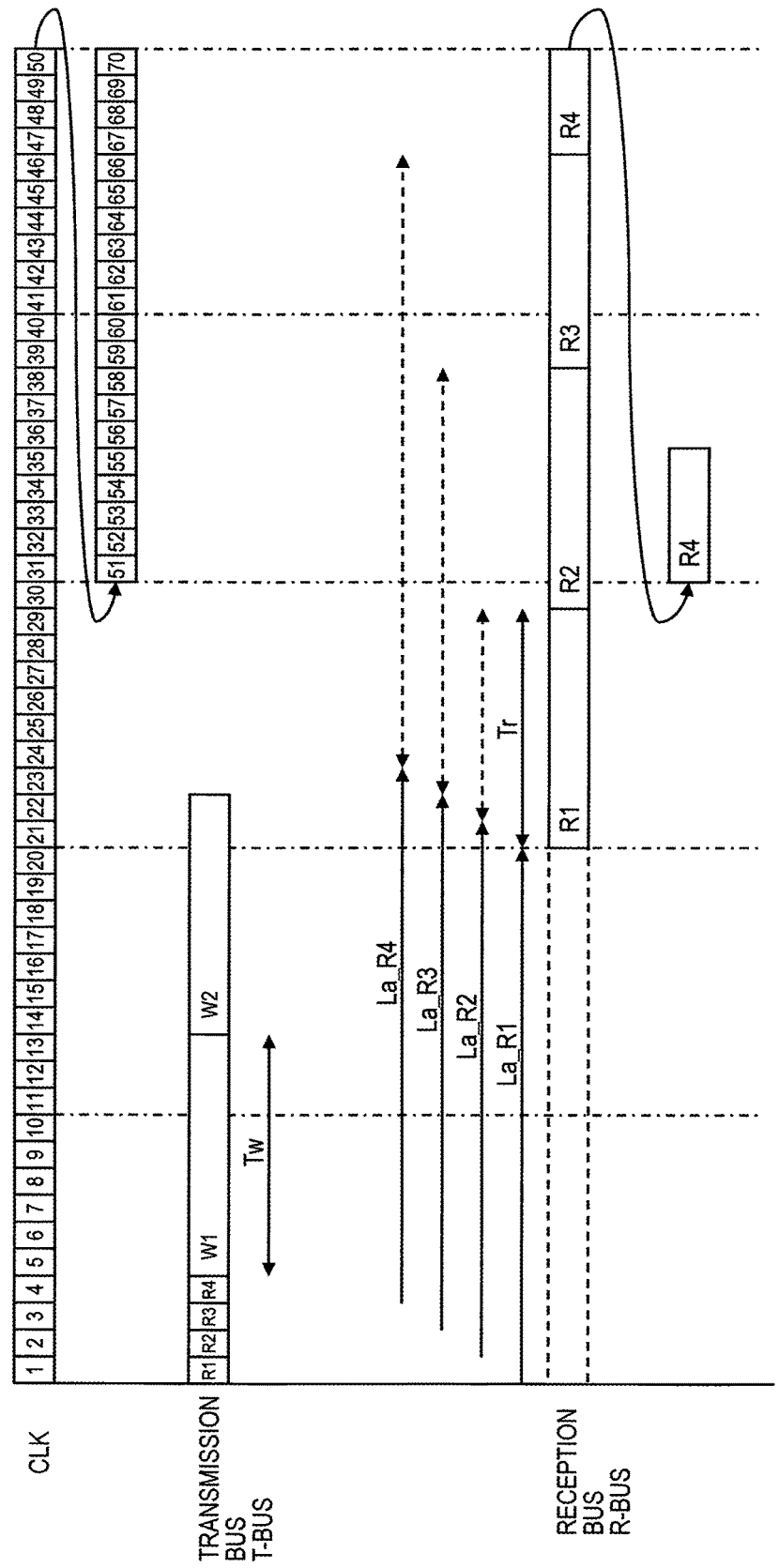
FIG. 7 is a diagram illustrating an operation performed by the memory controller 30 in a case where the read request is transmitted with a priority over the write request

FIG. 7 is a diagram illustrating an operation performed by the memory controller 30 in a case where the read request is transmitted with a priority over the write request, under the same conditions as in the example of FIG. 6. Considering a general order of processing performed by the processor core from the data fetching, the processing, to write back of the resultant data, the read request is transmitted with a priority over the write request to reduce, or if possible, eliminate the idle cycle in the reception bus R-BUS illustrated in FIG. 7.

When the read request has the higher priority, as illustrated in FIG. 7, the read requests R1, R2, R3, and R4 are transmitted first respectively at the points where CLK=1 to 4. Then, the packet group of the write request W1 is transmitted from the clock CLK=5, and the packet group of the write request W2 is transmitted from the clock CLK=14. Then, the read data groups respectively corresponding to the four read requests consecutively monopolize the reception bus R-BUS, after the latency time La_R1 for the read request R1 from the clock CLK=21. As a result, the reception bus R-BUS has no idle cycle.

However, as a result of transmitting the read requests with a higher priority, the write requests W1 and W2 remain untransmitted for a long time.

Furthermore, the read data corresponding to the read request R1 is started to be received after the latency time La_R1, that is, from the point where CLK=21. The read data corresponding to R2 is started to be received after the latency time La_R2 and after eight cycles, that is, from the point where CLK=30. The read data corresponding to R3 is started to be received after the latency time La_R3 and after 16 cycles, that is, from the point where CLK=39. The read data corresponding to R4 is started to be received after the latency time La_R4 and after 24 cycles, that is, from the point where CLK=47. This implies that when a plurality of read requests are serially transmitted, the transmission of the read request with a higher priority only results in a long waiting period until the reception starts due to the long monopolized state of the reception bus R-BUS. Thus, transmitting the write request first during the long waiting period for the read data might not affect the reception start time of the read request.

Figure 8:
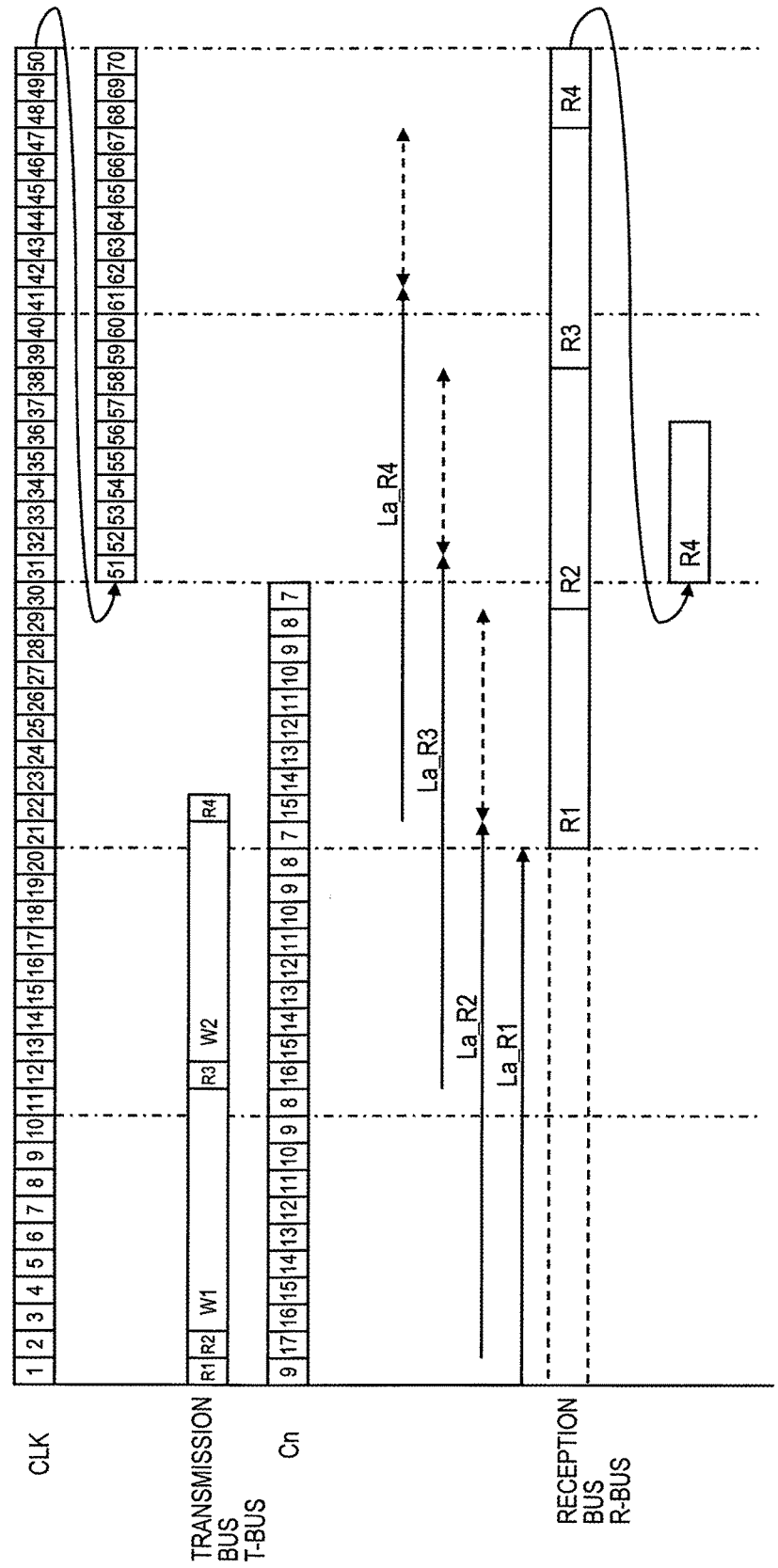
FIG. 8 is a diagram illustrating the request arbitration operation performed by the memory controller 30 in this embodiment.
Figure 9:
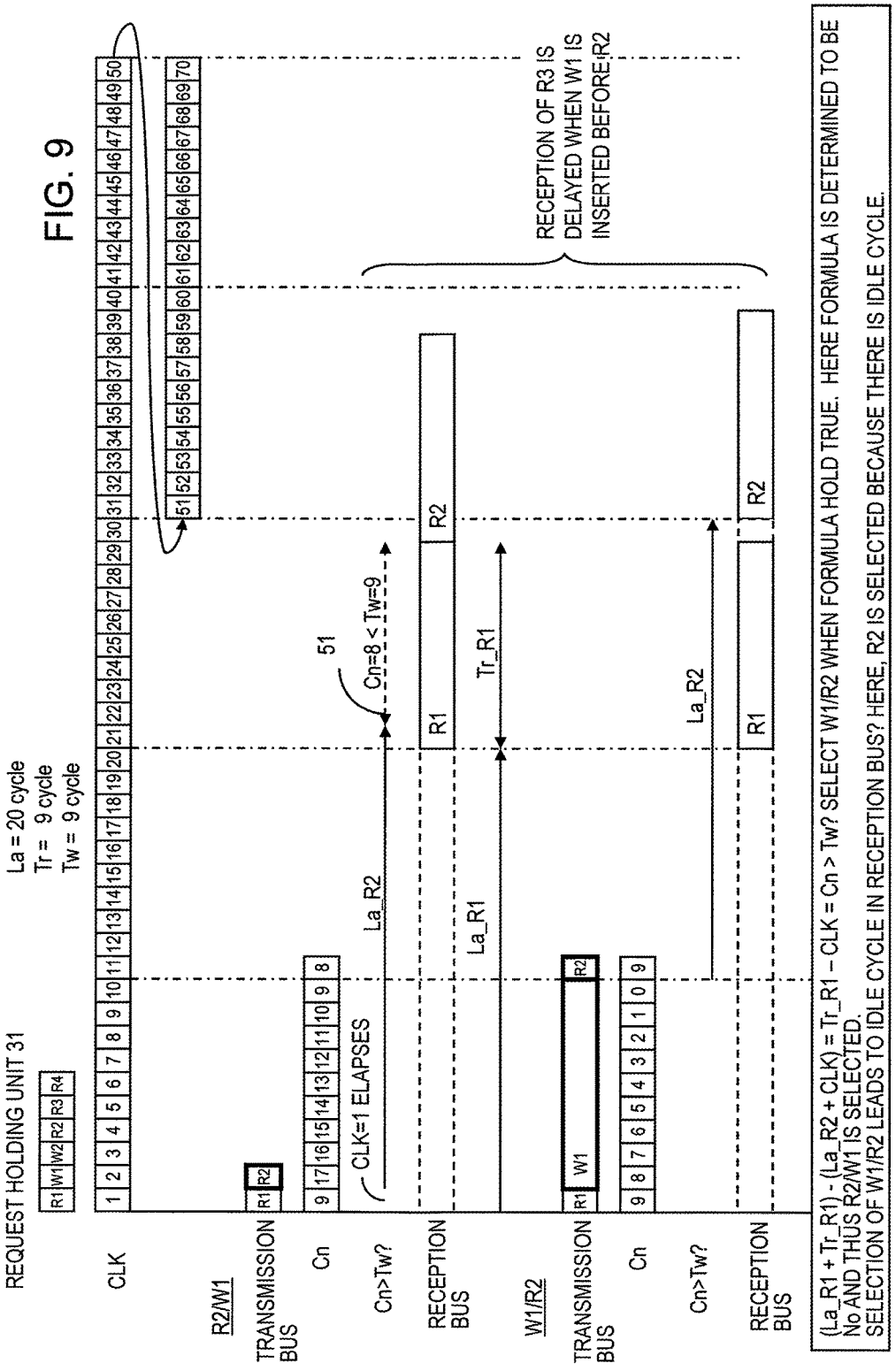
FIGS. 9 and 10 are diagrams for describing the request arbitration performed by the memory controller 30 in this embodiment.
Figure 10:
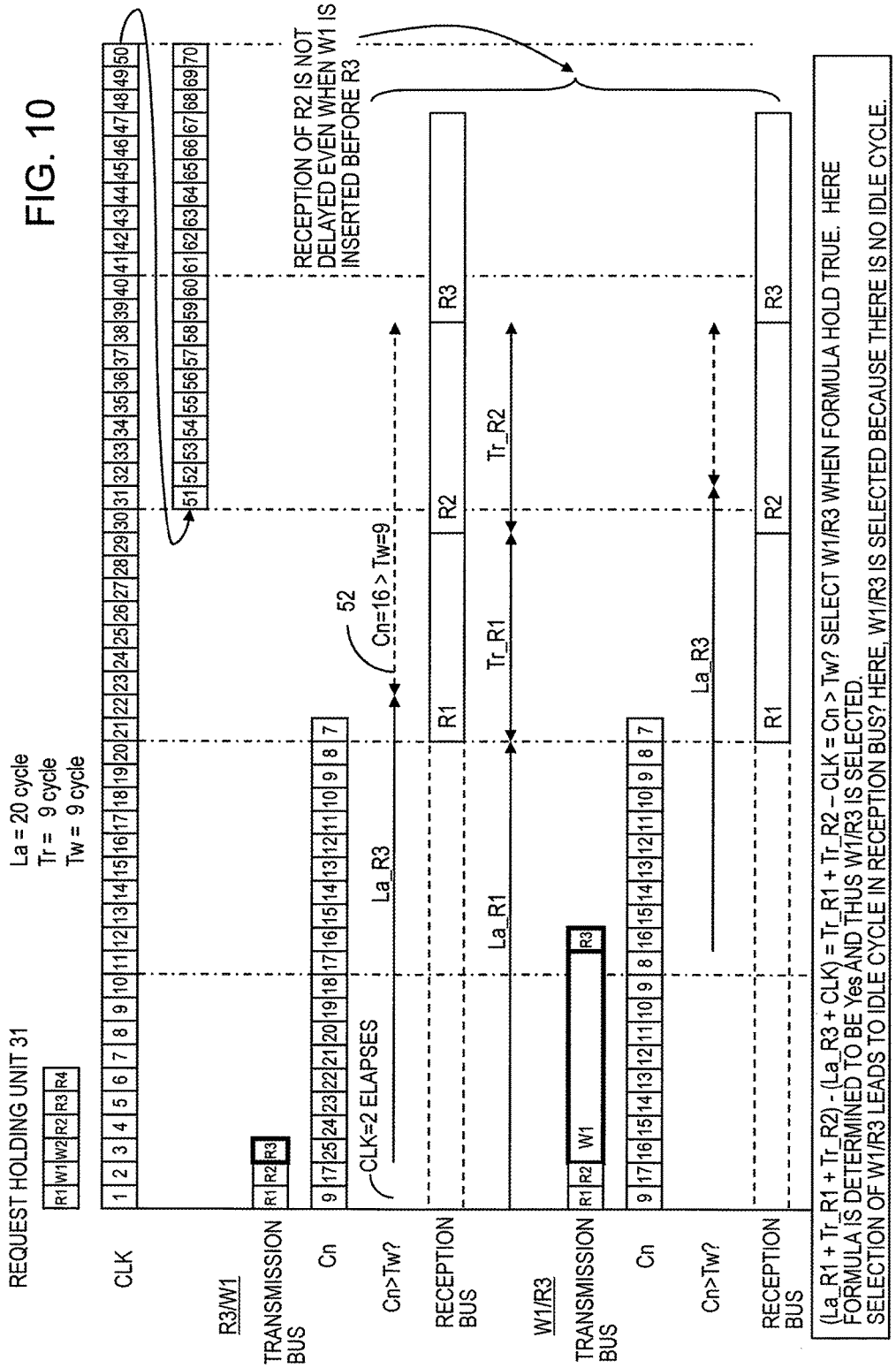

FIG. 8 is a diagram illustrating the request arbitration operation performed by the memory controller 30 in this embodiment. FIGS. 9 and 10 are diagrams for describing the request arbitration performed by the memory controller 30 in this embodiment under the same conditions as in FIGS. 6 and 7.

As illustrated in FIG. 5, in the request arbitration in this embodiment, while the read and the write requests in transmission standby are held in the request holding unit 31, the reception start time of the read data in the case where the read request is transmitted with a higher priority is compared with the reception start time of the read data in the case where the write request is transmitted with a higher priority and then the read request is transmitted. When the reception time of the read data is the same even when the write request is transmitted with a higher priority, the write request is transmitted first, and then the read request is transmitted. The request arbitration operation is described based on this mechanism.

[Arbitration to Determine R1 or W1 at the Point where CLK=1]

The request arbitration unit 32 determines one of the read request R1 and the write request W1 to be transmitted first. At this point, when the read request R1 is transmitted at the point where CLK=1, the reception of the read data is started after the corresponding latency time La_R1=20, that is, from the point where CLK=21. Thus, it is a matter of course that the arbitration is performed in such a manner that the read request R1 is transmitted before the write request W1 is transmitted. As a result, the read request R1 is transmitted at the point where CLK=1 in FIG. 8.

[Arbitration to Determine R2 or W1 at the Point where CLK=2]

Then, at the point where CLK=2, the request arbitration unit 32 determines one of the read request R2 and the write request W1 to be transmitted first, in a manner illustrated in FIG. 9. FIG. 9 illustrates a case R2/W1 where the read request R2 is transmitted first, and a case W1/R2 where the write request W1 is transmitted first and then the read request R2 is transmitted.

In the case R2/W1 where the read request R2 is transmitted first, the header of the read request R2 is transmitted to the transmission bus T-BUS at the point where the clock CLK=2. Then, the read data is started to be received by the reception bus R-BUS after the latency time La_R2 and after the eight cycles of CLK=22 to 29, that is, from the point where CLK=30. The eight cycles of CLK=22 to 29 is the same as the count value Cn of the counter 35 at the point where the clock CLK=2. Thus, eight cycles of CLK=22 to 29 is the difference between a clock cycle (La_R1+Tr) and a clock cycle (La_R2+CLK(1)). The clock cycle (La_R1+Tr) is a cycle to the point where the monopoly of the reception bus R-BUS by the read data corresponding to the read request R1 is completed. The clock cycle (La_R2+CLK (1)) is obtained by adding the number of elapsed clocks CLK (1), from the point where CLK=1 to the point where CLK=2, to the latency time La_R2 for the read request R2 transmitted at the point where CLK=2. The difference is represented as follows:

$(La\_R1+Tr)-(La\_R2+CLK(1))$ (Formula 1).

When the latency time La_R1 for the read request R1 and the latency time La_R2 for the read request R2 are (La_R1=La_R2=20), Formula 1 is solved as follows:

$(La\_R1+Tr)-(La\_R2+CLK(1))=Tr-CLK(1)$ (Formula 2).

The solution in Formula 2 is the same as the count value Cn of the counter 35. The count value Cn is obtained by subtracting the clock cycle 1 elapsed after the read request R1 is transmitted and until the next read request R2 is transmitted, from the cycle Tr=9 during which the read data corresponding to the read request R1 monopolizes the reception bus R-BUS.

$Cn=Tr-CLK(1)$ (Formula 3).

The count value Cn represents the clock cycle illustrated with a dashed line 51 (CLK=22 to 29) in FIG. 9.

In the case W1/R2 where the write request W1 is transmitted first and then the read request R2 is transmitted, the packet group of the write request W1 is transmitted at the point where CLK=2, and thus the read request R2 is transmitted at the point where CLK=11. Thus, the read data is started to be received after the latency time La_R2, that is, from the point where CLK=31. The reception start time CLK=31 is later than a reception start time CLK=30 of a case where the read request R2 is transmitted first. Therefore, the reception bus R-BUS has a single idle cycle. Specifically, in the case where R2 is transmitted first, the reception of the read data corresponding to R2 starts after the reception of the read data corresponding to R1 is completed because R1 and R2 are serially transmitted.

Thus, the request arbitration unit 32 determines whether Cn≥Tw holds true. Cn represents the number of cycles after the latency time La_R2 for R2 elapses and until the reception of the read data corresponding to R1 is completed, in the case where R2 is transmitted first, as illustrated with the dashed line 51 in FIG. 9. Tw represents the cycles during which the transmission bus T-BUS is monopolized by the write request W1. When Cn Tw is determined to be YES, the start of the read data reception does not delay even when the transmission of the read request R2 is delayed by the cycles Tw as a result of transmitting the write request W1 first. When Cn≥Tw is determined to be NO, the start of the read data reception is delayed when the write request W1 is inserted, and thus the read request R2 is transmitted first.

In the example illustrated in FIG. 9, the count value Cn of the counter 35 is incremented to Cn=9 at the point where CLK=1 by the transmission of R1, and then changes to Cn=8 at the point where CLK=2. Thus, Cn≥Tw is determined to be NO, whereby the read request R2 is transmitted first. Thus, as illustrated in FIG. 8, the read request R2 is transmitted before W1 is transmitted, at the point where CLK=2.

As described above, the count value Cn of the counter 35 is incremented by Tr when the read request is transmitted, and is decremented in synchronization with the clock CLK, that is, by one in synchronization with the clock when the count value Cn is not 0. Thus, when La_R1=La_R2, the count value Cn of the counter 35 represents the number of cycles (the number of cycles indicated by the dashed line arrow 51 in FIG. 9) from the point (CLK=20), right after the latency time La_R2 elapses from the determination point CLK=2, to the point (CLK=29), at which the monopoly state where the reception bus R-BUS by the read data corresponding to the read request transmitted at the determination point CLK=2 is completed.

[Arbitration to Determine R3 or W1 at the Point where CLK=3]

Next, at the point where CLK=3, the request arbitration unit 32 determines one of the read request R3 and the write request W1 to be transmitted first, in a manner illustrated in FIG. 10. FIG. 10 illustrates a case R3/W1 where the read request R3 is transmitted first, and a case W1/R3 where the write request W1 is transmitted first and then the read request R3 is transmitted.

In the case R3/W1, where the read request R3 is transmitted first, the header of the read request R3 is transmitted to the transmission bus T-BUS at the point where the clock CLK=3. Then, the read data is started to be received by the reception bus R-BUS after a latency time La_R3 and after 16 cycles illustrated with an arrow 52, that is, from the point where CLK=39. The 16 cycles are the same as the count value Cn of the counter 35. The count value Cn is obtained by subtracting the clock cycles, 2, elapsed until R3 is transmitted after the read request R1 is transmitted, from cycles 2Tr=18 during which the read data corresponding to the read requests R1 and R2 monopolizes the reception bus R-BUS, when the latencies La_R1 and La_R2 for the respective read requests R1 and R2 are the same as the latency time La_R3 for R3 (La_R1=La_R 2=La_R3=20).

In the case W1/R3 where the write request W1 is transmitted first and then the read request R3 is transmitted, the packet group of the write request W1 is transmitted at the point where CLK=3, and thus the read request R3 is transmitted at the point where CLK=12. Then, the reception of the read data corresponding to R3 starts after the latency time La_R3 elapses after the point where CLK=12 and then when the monopoly state of the reception bus R-BUS by the read data of R1 and R2 is completed, that is, from the point where CLK=39. This reception start point CLK=39 is the same as the reception start point CLK=39 in the case where the read request R3 is transmitted first, and thus no delay occurs. All things considered, as illustrated in FIG. 8, the request arbitration unit 32 performs the arbitration in such a manner that the write request W1 is transmitted first.

The arbitration described above is described by referring to the count value Cn of the counter 35. As illustrated in FIG. 10, the count value Cn of the counter 35 drops to Cn=16 at the point where CLK=3. Thus, at the determination point at the point where CLK=3, Cn=16 Tr=9 is determined to be YES. Specifically, even when the read request R3 is transmitted first, the reception of the read data corresponding to R3 can only be started after the latency time La_R3=20 elapses and then the cycles Cn=16 elapses from the point where CLK=3, that is, from the point where CLK=39, which is the same as that in the case where W1 is transmitted before R3. All things considered, the write request W1 is transmitted first.

[Arbitration to Determine R3 or W2 at the Point where CLK=12]

Next, as illustrated in FIG. 8, the request arbitration unit 32 determines R3 or W2 at the point where CLK=12. At the point where CLK=12, the count value Cn is reduced to Cn=7, resulting in Cn=7 Tr=9 determined to be NO, and thus the read request R3 is transmitted first.

[Arbitration to Determine R4 or W2 at the Point where CLK=13]

Next, as illustrated in FIG. 8, the request arbitration unit 32 determines R4 or W2 at the point where CLK=13. At the point where CLK=13, the count value Cn is increased to Cn=15, resulting in Cn=15 Tr=9 determined to be YES, and thus the write request W2 is transmitted first.

As illustrated in FIG. 8, in the arbitration method of this embodiment, the read request is transmitted with a higher priority to eliminate the idle cycle as much as possible in the reception bus R-BUS. Still, serial transmission of read requests leads to a long monopolized time of the reception bus R-BUS, which in turn delays the reception start time of the read data corresponding to the transmitted read request. Thus, the write request is transmitted with a priority over the read request, when the number of delayed cycles Cn is not smaller than the number of cycles Tw during which the transmission bus T-BUS is monopolized by the transmission of the write request. This determination can be made based on determination on whether the count value Cn of the counter 35 is not smaller than the monopolized cycle Tw.

FIG. 11 is a diagram exemplary illustrating how the count value Cn of the counter 35 is reset, under the conditions that the request holding unit 31 holds only the read request R1 at the point where CLK=1, and then holds R2, R3, W1, W1, and W4 after a predetermined clock cycle, specifically, at the point where CLK=11.

At the point where CLK=1, the request arbitration unit 32 transmits the only read request R1 in transmission standby, and thus the count value Cn increases to Cn=9. Then, the count value Cn decreases in each clock cycle to be 0 at the point where CLK=10, and will not decrease any further.

Then, when the read request R2 is transmitted in CLK=11, the count value Cn is again incremented by Tr=9, and thus is then again decreased in each clock cycle.

As described above, the count value Cn of the counter 35 is reset by hitting 0 even when the read request is not transmitted in series. The countdown resumes when the count value Cn is again incremented by Tr=9, by the transmission of the subsequent read request. All things considered, the count value Cn of the counter 35 is appropriately maintained for the determination in the request arbitration.

Second Embodiment

In an arbitration method performed by the request arbitration unit 32 in a second embodiment, the write request W is transmitted first when Cn+D≥Tw (D is an allowable read data reception delay amount or a reference time) is determined to be YES, and the read request R is transmitted first when Cn+D≥Tw is determined to be NO. Here, D is set as the allowable read data reception delay amount, and D=2, for example. When Cn+D≥Tw is determined to be YES, the delay in the read data reception start time is at least within the allowable delay time D, and thus the write request W is transmitted. When Cn+D≥Tw is determined to be NO, the delay in the read data reception start time exceeds the allowable delay time D, and thus the read request R is transmitted.

The adaptive control of the level of the priority of the read request or of the delay in the write request can be achieved by adaptively control of the allowable delay time D by the request arbitration unit 32. Specifically, the request arbitration unit 32 implements the adaptive control by appropriately setting allowable delay time D, during which the monopolized state of the reception bus R-BUS is an idle state.

Third Embodiment

In the first embodiment, the determination is made with Tr=9 and Tw=9 under the condition that the burst length of each of the read and the write requests is fixed to 8. A third embodiment is able to cope with a state where the burst length of the read request can be changed rather than being fixed and/or a state where the write request can be changed rather than being fixed.

Specifically, in the third embodiment, $Cn \geq Tw$ is determined with Tr=burst length+1 and Tw=burst length+1 and the count value Cn of the counter 35 is incremented by Tr when the read request is transmitted. Thus, the determination of the request arbitration in this embodiment can be performed with the variable burst length.

In the third embodiment, the determination of the request arbitration may be performed while taking the allowable delay time D in consideration as in the second embodiment.

As described above, in the embodiments, transmission control for read and write requests can be performed with a theoretical maximum throughput in a configuration where a transmission serial bus T-BUS and a reception serial bus R-BUS connect between a memory controller and a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A memory controller comprising:
a request holding unit configured to hold a write request and a read request that are received;
a transmission unit configured to transmit any one of the write request with write data and the read request to a memory through a transmission bus;
a reception unit configured to receive read data corresponding to the read request from the memory through a reception bus; and
a request arbitration unit configured to transmit one of the write request with the write data or the read request to the transmission bus through the transmission unit, when the request holding unit holds the write request and the read request both being in transmission standby, wherein
the request arbitration unit performs, when the request holding unit holds the write request and the read request both being in transmission standby,
a first processing of transmitting the write request with the write data to the transmission bus through the transmission unit before transmitting the read request, when a first reception time is not later than a second reception time; and
a second processing of transmitting the read request to the transmission bus through the transmission unit before transmitting the write request with the write data, when the first reception time is later than the second reception time,
the first reception time is a time when reception, through the reception bus from the memory, of the read data corresponding to the read request is started in a case where the write request with the write data is transmitted to the transmission bus before the read request, and
the second reception time is a time when the reception, through the reception bus from the memory, of the read data corresponding to the read request is started in a case where the read request is transmitted to the transmission bus before the write request and the write data.

2. The memory controller according to claim 1, wherein
the transmission unit is configured to transmit any one of the write request with write data having a write burst length and the read request to the memory through the transmission bus, in synchronization with a clock,
the reception unit is configured to receive read data having a read burst length from the memory through the reception bus, in synchronization with the clock,
the request arbitration unit includes a counter configured to, every time the read request is transmitted from the transmission unit, increment a count value according to the number of read data reception cycles, during which the read data corresponding to the transmitted read request monopolizes the reception bus while the read data is being received, and decrement, when the count value is not 0, the count value by one in each cycle of the clock, and
the request arbitration unit is configured to perform the first processing when the count value of the counter is equal to or larger than the number of write transmission cycles, during which the transmission bus is monopolized while the write request and the write data having the write burst length is being transmitted, and also configured to perform the second processing when the count value of the counter is smaller than the number of write transmission cycles.

3. The memory controller according to claim 1, wherein
the request holding unit includes a write request queue holding unit configured to hold write requests in order of reception, and transmit the write requests in the order of reception, and a read request queue holding unit configured to hold read requests in order of reception, and transmit the write requests in the order of reception,
the request arbitration unit is configured to perform arbitration to determine which one of a first write request in the write request queue holding unit and a first read request in the read request queue holding unit is to be transmitted first.

4. A memory controller comprising:
a request holding unit configured to hold a write request and a read request that are received;
a transmission unit configured to transmit any one of the write request with write data and the read request to a memory through a transmission bus;
a reception unit configured to receive read data corresponding to the read request from the memory through a reception bus; and
a request arbitration unit configured to transmit one of the write request with the write data or the read request to the transmission bus through the transmission unit, when the request holding unit holds the write request and the read request both being in transmission standby, wherein the request arbitration unit performs, when the request holding unit holds the write request and the read request both being in transmission standby, a first processing of transmitting the write request with the write data to the transmission bus through the transmission unit before transmitting the read request, when a first reception time is not later than a second reception time by a reference time; and a second processing of transmitting the read request to the transmission bus through the transmission unit before transmitting the write request with the write data, when the first reception time is later than the second reception time by the reference time, the first reception time is a time when reception, through the reception bus from the memory, of the read data corresponding to the read request is started in a case where the write request with the write data is transmitted to the transmission bus before the read request, and the second reception time is a time when the reception, through the reception bus from the memory, of the read data corresponding to the read request is started in a case where the read request is transmitted to the transmission bus before the write request and the write data.

5. The memory controller according to claim 4, wherein the transmission unit is configured to transmit any one of the write request with write data having a write burst length and the read request to the memory through the transmission bus, in synchronization with a clock, the reception unit configured to receive read data having a read burst length from the memory through the reception bus, in synchronization with the clock, the request arbitration unit includes a counter configured to, every time the read request is transmitted from the transmission unit, increment a count value according to the number of read data reception cycles, during which the read data corresponding to the transmitted read request monopolizes the reception bus while the read data is being received, and decrement, when the count value is not 0, the count value by one in each cycle of the clock, and the request arbitration unit is configured to perform the first processing when a value obtained by adding the number of cycles in the reference period to the count value of the counter is equal to or larger than a number of write transmission cycles, during which the transmission bus is monopolized while the write request and the write data having the write burst length is being transmitted, and also performs the second processing when the value obtained by adding the number of clock cycles in the reference period to the count value of the counter is smaller than the number of write transmission cycles.

6. An information processing apparatus comprising:

a processor core configured to issue a write request and a read request to a memory; and a memory controller configured to receive the write request and the read request issued by the processor core, and transmit any one of the write request and the read request to a transmission bus, wherein the memory controller includes:

a request holding unit configured to hold a write request and a read request that are received;

a transmission unit configured to transmit any one of the write request with write data and the read request to a memory through a transmission bus;

a reception unit configured to receive read data corresponding to the read request from the memory through a reception bus; and a request arbitration unit configured to transmit one of the write request with the write data or the read request to the transmission bus through the transmission unit, when the request holding unit holds the write request and the read request both being in transmission standby, wherein the request arbitration unit performs, when the request holding unit holds the write request and the read request both being in transmission standby, a first processing of transmitting the write request with the write data to the transmission bus through the transmission unit before transmitting the read request, when a first reception time is not later than a second reception time; and a second processing of transmitting the read request to the transmission bus through the transmission unit before transmitting the write request with the write data, when the first reception time is later than the second reception time, the first reception time is a time when reception, through the reception bus from the memory, of the read data corresponding to the read request is started in a case where the write request with the write data is transmitted to the transmission bus before the read request, and the second reception time is a time when the reception, through the reception bus from the memory, of the read data corresponding to the read request is started in a case where the read request is transmitted to the transmission bus before the write request and the write data.

7. An information processing apparatus comprising:

a processor core configured to issue a write request and a read request to a memory; and a memory controller configured to receive the write request and the read request issued by the processor core, and transmit any one of the write request and the read request to a transmission bus, wherein the memory controller includes:

a request holding unit configured to hold a write request and a read request that are received;

a transmission unit configured to transmit any one of the write request with write data and the read request to a memory through a transmission bus;

a reception unit configured to receive read data corresponding to the read request from the memory through a reception bus; and a request arbitration unit configured to transmit one of the write request with the write data or the read request to the transmission bus through the transmission unit, when the request holding unit holds the write request and the read request both being in transmission standby, wherein the request arbitration unit performs, when the request holding unit holds the write request and the read request both being in transmission standby, a first processing of transmitting the write request with the write data to the transmission bus through the transmission unit before transmitting the read request, when a first reception time is not later than a second reception time by a reference time; and a second processing of transmitting the read request to the transmission bus through the transmission unit before transmitting the write request with the write data, when the first reception time is later than the second reception time by the reference time, the first reception time is a time when reception, through the reception bus from the memory, of the read data corresponding to the read request is started in a case where the write request with the write data is transmitted to the transmission bus before the read request, and the second reception time is a time when the reception, through the reception bus from the memory, of the read data corresponding to the read request is started in a case where the read request is transmitted to the transmission bus before the write request and the write data.

8. A method of controlling a memory controller including: a request holding unit configured to hold a write request and a read request that are received; a transmission unit configured to transmit any one of the write request with write data and the read request to a memory through a transmission bus; and a reception unit configured to receive read data corresponding to the read request from the memory through a reception bus, the method comprising:

performing a first processing of transmitting the write request with the write data to the transmission bus through the transmission unit before transmitting the read request, when a first reception time is not later than a second reception time; and performing a second processing of transmitting the read request to the transmission bus through the transmission unit before transmitting the write request with the write data, when the first reception time is later than the second reception time, the first reception time is a time when reception, through the reception bus from the memory, of the read data corresponding to the read request is started in a case where the write request with the write data is transmitted to the transmission bus before the read request, and the second reception time is a time when the reception, through the reception bus from the memory, of the read data corresponding to the read request is started in a case where the read request is transmitted to the transmission bus before the write request and the write data.

9. A method of controlling a memory controller including: a request holding unit configured to hold a write request and a read request that are received; a transmission unit configured to transmit any one of the write request with write data and the read request to a memory through a transmission bus; and a reception unit configured to receive read data corresponding to the read request from the memory through a reception bus, the method comprising:

performing a first processing of transmitting the write request with the write data to the transmission bus through the transmission unit before transmitting the read request, when a first reception time is not later than a second reception time by a reference time; and performing a second processing of transmitting the read request to the transmission bus through the transmission unit before transmitting the write request with the write data, when the first reception time is later than the second reception time by the reference time, the first reception time is a time when reception, through the reception bus from the memory, of the read data corresponding to the read request is started in a case where the write request with the write data is transmitted to the transmission bus before the read request, and the second reception time is a time when the reception, through the reception bus from the memory, of the read data corresponding to the read request is started in a case where the read request is transmitted to the transmission bus before the write request and the write data.

\* \* \* \* \*